United States Patent
Zhang

(10) Patent No.: US 11,414,269 B2
(45) Date of Patent: Aug. 16, 2022

(54) POWER-TAKING DEVICE AND RAIL GUIDE VEHICLE

(71) Applicant: BEIJING JINGDONG QIANSHI TECHNOLOGY CO., LTD., Beijing (CN)

(72) Inventor: Yafang Zhang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 308 days.

(21) Appl. No.: 16/765,188

(22) PCT Filed: Nov. 10, 2018

(86) PCT No.: PCT/CN2018/114936
§ 371 (c)(1),
(2) Date: May 19, 2020

(87) PCT Pub. No.: WO2019/096079
PCT Pub. Date: May 23, 2019

(65) Prior Publication Data
US 2020/0346865 A1    Nov. 5, 2020

(30) Foreign Application Priority Data
Nov. 20, 2017  (CN) .......................... 201711159571.X

(51) Int. Cl.
*B65G 35/06* (2006.01)
*B65G 1/04* (2006.01)

(52) U.S. Cl.
CPC ........... *B65G 1/0492* (2013.01); *B65G 35/06* (2013.01)

(58) Field of Classification Search
CPC .............................. B65G 1/0492; B65G 35/06
See application file for complete search history.

(56) References Cited

U.S. PATENT DOCUMENTS 5,551,350 A * 9/1996 Yamada ............... B65G 1/0492
                                                 104/293
6,149,366 A * 11/2000 Deandrea ............ B65G 1/0414
                                                 414/279

(Continued)

FOREIGN PATENT DOCUMENTS

CN    202150615 U    2/2012
CN    202864844 U    4/2013
(Continued)

OTHER PUBLICATIONS

The ISR dated Jan. 30, 2019 by the WIPO.
(Continued)

*Primary Examiner* — Saul Rodriguez
*Assistant Examiner* — Ashley K Romano
(74) *Attorney, Agent, or Firm* — Qinghong Xu

(57) ABSTRACT

The present disclosure discloses a power-taking device for a rail guide vehicle. The rail guide vehicle includes a chassis travelling mechanism and a loading mechanism including a fixing plate, a power plate, an extension plate and a shifting fork, the fixing plate is fixed to the chassis travelling mechanism, the power plate and the extension plate can be translated, and the shifting fork is coupled to, can be translated in synchronization with, and can be rotated with respect to the extension plate. The power-taking device includes: a first conductive part, fixed to the fixing plate; a second conductive part, fixed to the power plate; and a third conductive part, fixed to the extension plate. When the first, second and third conductive parts are in contact, the power-taking device is turned on.

20 Claims, 6 Drawing Sheets

(56) References Cited

U.S. PATENT DOCUMENTS

| | | | | |
|---|---|---|---|---|
| 2007/0007079 | A1* | 1/2007 | Robbin | B65G 47/52 |
| | | | | 187/203 |
| 2016/0236869 | A1* | 8/2016 | Kimura | B65G 1/1378 |
| 2017/0233188 | A1* | 8/2017 | Tai | B65G 1/0492 |
| | | | | 414/281 |
| 2017/0313512 | A1 | 11/2017 | Miyagawa | |

FOREIGN PATENT DOCUMENTS

| | | |
|---|---|---|
| CN | 203229120 U | 10/2013 |
| CN | 205169926 U | 4/2016 |
| CN | 205555215 U | 9/2016 |
| CN | 107161584 A | 9/2017 |
| JP | H11208817 A | 8/1999 |
| JP | 2017197342 A | 11/2017 |

OTHER PUBLICATIONS

The CN1OA dated Sep. 27, 2019 by the CNIPA.
The 1st Office Action dated May 11, 2021 for JP patent application No. 2020-522674.

* cited by examiner

POWER-TAKING DEVICE AND RAIL GUIDE VEHICLE

CROSS-REFERENCE TO RELATED APPLICATIONS

The present application is based upon International Application No. PCT/CN2018/114936, filed on Nov. 10, 2018, which is based upon and claims priority to the Chinese Patent Application No. 201711159571.X, filed on Nov. 20, 2017, the entire contents of which are incorporated herein by reference.

TECHNICAL FIELD

The present disclosure relates to a power-taking device for a rail guide vehicle, and in particular, to a power-taking device for a shifting fork of a rail guide vehicle.

BACKGROUND

An RGV (rail guide vehicle) is an intelligent robot, which may for example pick up, transport, and release a pallet or container and the like by being programmed, and may communicate with an upper computer or a WMS system for using an identification technique such as FRID and bar code to realize functions such as automatic identification and access. The rail guide vehicle is widely used in a logistics system and has characteristics such as fast speed, high reliability and low cost.

Generally, 15 to 30 or more rail guide vehicles are arranged in each lane on a high goods shelf. The rail guide vehicle includes a chassis travelling mechanism and a loading mechanism on the chassis travelling mechanism. The chassis mechanism is configured to travel an entire vehicle body, and the loading mechanism is configured to perform certain terminal actions, so that it may pick up, place, lift, and rotate an object and the like.

At present, the loading portion of the rail guide vehicle is divided into a multiple-stroke mechanism and a single-stroke mechanism. The multiple-stroke refers to a power mechanism, in which a power mechanism travels an L distance, and a terminal actuating mechanism travels an N*L distance.

Regardless of the multiple-stroke mechanism and the single-stroke mechanism, a shifting fork on an extension arm thereof needs to take power/electricity. A general way of taking power is to arrange on the shifting fork an industrial towline, in which a towline cable or a flexible cable is disposed to take power. In a further way of taking power, a flexible cable is installed on an actuating part of the shifting fork.

There are following common shortcomings in the two ways of taking power.

1. Both the towline and the cable need to move relative to a moving part, and thus shall be replaced regularly because of their wear over time.

2. The above two ways of taking power shall move to some extent during use, which has certain requirements for installation, maintenance and replacement thereof, and disassembly thereof is relatively complicated.

3. Both the above two solutions need to purchase special towlines or cables, and thus the cost is relatively high.

SUMMARY

The present disclosure provides a power-taking device for a rail guide vehicle. The rail guide vehicle includes a chassis travelling mechanism and a loading mechanism on the chassis travelling mechanism, the loading mechanism includes a fixing plate, a power plate, an extension plate and a shifting fork, the fixing plate is fixed to the chassis travelling mechanism, the power plate and the extension plate can be translated with respect to the fixing plate, and the shifting fork is coupled to the extension plate, can be translated in synchronization with the extension plate, and can be rotated with respect to the extension plate. The power-taking device for the rail guide vehicle includes a first conductive part, a second conductive part and a third conductive part. The first conductive part is fixed to the fixing plate and electrically connected to a power supply. The second conductive part is fixed to the power plate. The third conductive part is fixed to the extension plate and electrically connected to an actuating mechanism for the shifting fork. When the first conductive part, the second conductive part and the third conductive part are in contact with each other, the power-taking device is turned on, and the actuating mechanism for the shifting fork obtains power from the power supply, so that the shifting fork can be driven to be rotated.

BRIEF DESCRIPTION OF THE DRAWINGS

Various objects, features, and advantages of the present disclosure will become more apparent, by described preferable embodiments of the present disclosure in detail in conjunction with the drawings. The drawings are merely exemplary illustrations of the present disclosure and are not necessarily drawn to scale. In the drawings, the same reference numerals always denote the same or similar parts, in which.

DETAILED DESCRIPTION

Figure 1:
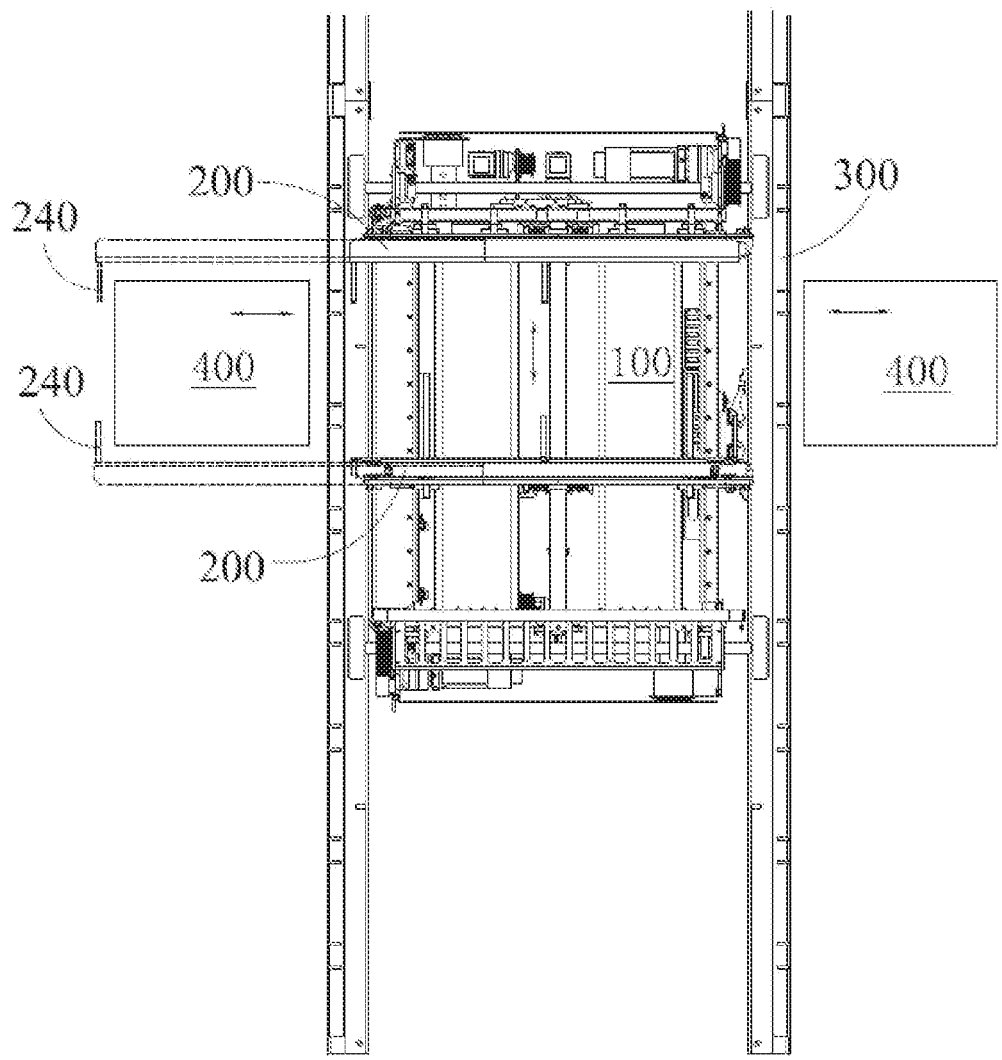
FIG. 1 is a schematic view of a use state of a rail guide vehicle.

Example embodiments will now be described more fully with reference to the drawings. However, the example embodiments may be implemented in various forms, and should not be construed as being limited to the embodiments set forth herein; on the contrary, these embodiments are provided so that the present disclosure is comprehensive and complete and fully convey the idea of the exemplary embodiments to those skilled in the art. The same reference numerals in the drawings denote the same or similar parts, and thus their repeated description will be omitted.

Relative terms such as "lower" or "bottom" and "higher" or "top" may be used in the embodiments to describe the relative relationship of one component shown to another component. It can be understood that if the device shown is turned upside down, the component on the "lower" side will become the component on the "higher" side. In addition, when a layer is "on" an other layer or substrate, it may refer that the layer is "directly" on the other layer or substrate, or that there is an additional layer between the layer and the other layer or substrate.

Figure 2:
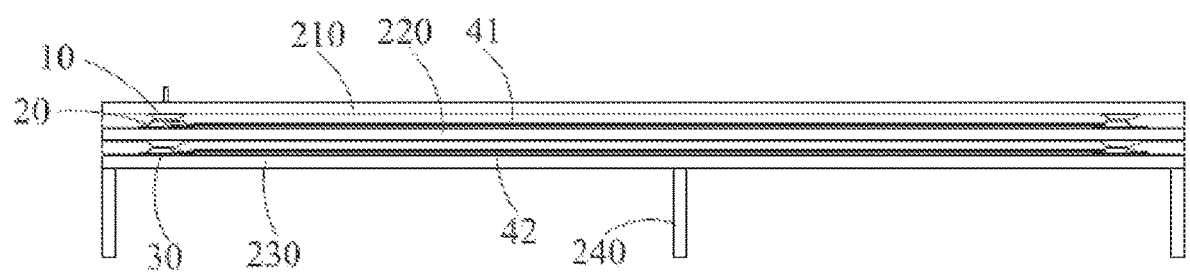
FIG. 2 is a front view of a power-taking device of one of loading mechanisms of the rail guide vehicle according to the present disclosure.
Figure 3:
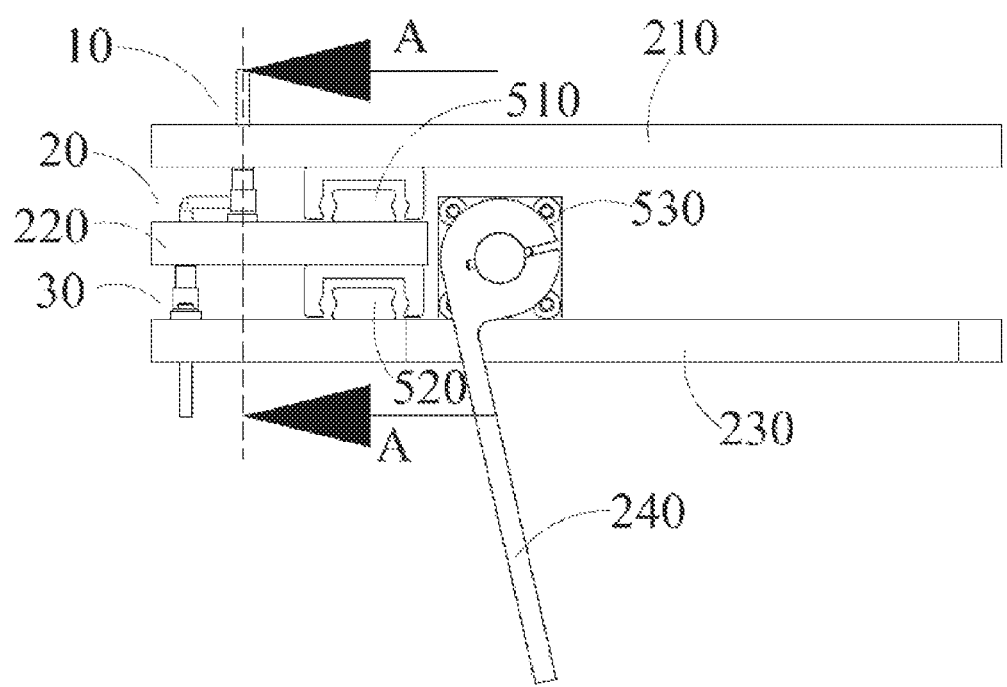
FIG. 3 is a side view of the power-taking device of one of the loading mechanisms of the rail guide vehicle according to the present disclosure.
Figure 4:
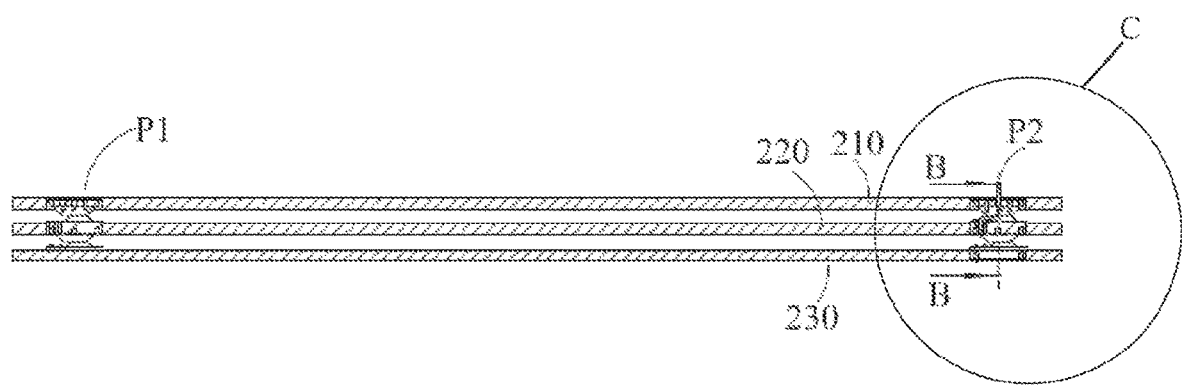
FIG. 4 is a cross-sectional view taken along line AA in FIG. 3.

The present disclosure provides a power-taking device for a rail guide vehicle. As shown in FIGS. 1 and 2, the rail guide vehicle includes a chassis travelling mechanism 100 and a loading mechanism 200 on the chassis travelling mechanism 100. The loading mechanism 200 includes a fixing plate 210, a power plate 220, an extension plate 230 and a shifting fork 240, the fixing plate 210 is fixed to the chassis travelling mechanism 100, the power plate 220 and the extension plate 230 can be translated with respect to the fixing plate 210, and the shifting fork 240 is coupled to the extension plate 230, can be translated in synchronization with the extension plate 230, and can be rotated with respect to the extension plate 230.

In an embodiment, as shown in FIG. 1, the rail guide vehicle travels on two rails 300, and goods shelves (now shown) for storage of containers 400 are located at both sides of the rails 300. The rail guide vehicle may move forward and backward along the arrow in the figure to transport the container 400. There may be two loading mechanisms 200, and the two loading mechanisms 200 are used coordinately to move to the left or right simultaneously in a lateral direction. When the loading mechanisms 200 move to the left simultaneously, a first container 400 (as shown by the dotted line in FIG. 1) may be picked up/sent, and when the loading mechanisms 200 move to the right simultaneously, a second container 400 may be picked up/sent.

Figure 5:
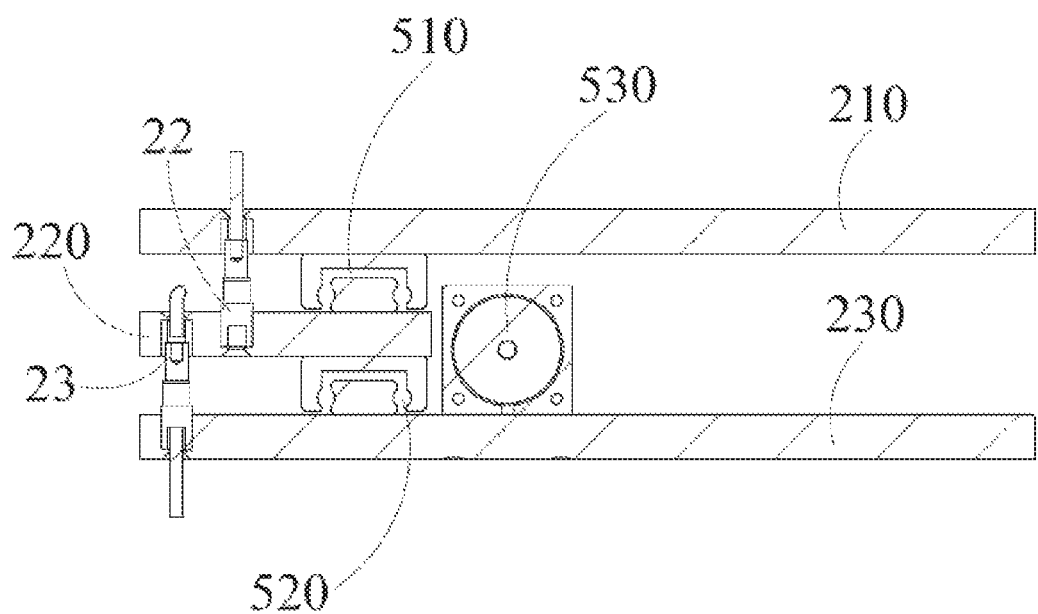
FIG. 5 is a cross-sectional view taken along line BB in FIG. 4.

As shown in FIG. 5, the rail guide vehicle may further include a first guide rail 510 and a second guide rail 520, the fixing plate 210 and the power plate 220 are coupled via the first guide rail 510, and the power plate 220 and the extension plate 230 are coupled via the second guide rail 520. In this way, it ensures that the lateral direction along which the loading mechanism 200 moves is accurate. In addition, an actuating mechanism 530 for the shifting fork may be provided on the extension plate 230 to drive the shifting fork 240 to rotate.

The process for picking up/sending the container 400 is as follows: the extension plate 230 reaches out to an outer edge of the container 400—the shifting fork 240 rotates to get the container 400—the extension plate 230 retracts—the rail guide vehicle starts—the extension plate 230 reaches out—the shifting fork 240 rotates—the extension plate 230 retracts. Through the above-mentioned process, a cycle of picking up/sending the container 400 is completed.

In the above process, it is necessary to supply power to the shifting fork 240 for being rotated. Therefore, the present disclosure provides a power-taking device for the rail guide vehicle. The power-taking device for the rail guide vehicle includes a first conductive part 10, a second conductive part 20 and a third conductive part 30. The first conductive part 10 is fixed to the fixing plate 210 and electrically connected to a power supply. The second conductive part 20 is fixed to the power plate 220. The third conductive part 30 is fixed to the extension plate 230 and electrically connected to the actuating mechanism 530 for the shifting fork.

When the first conductive part 10, the second conductive part 20 and the third conductive part 30 are in contact with each other, the power-taking device is turned on, and the actuating mechanism 530 for the shifting fork obtains power from the power supply, so that the shifting fork 240 can be driven to be rotated.

The power-taking device of the present disclosure is provided on the fixing plate 210, the power plate 220 and the extension plate 230 of the loading mechanism 200 instead of being provided on the shifting fork 240, and no cable is provided on the shifting fork 240, therefore, the movement of the shifting fork 240 would not be affected and thus problems such as wear can be avoided, thereby improving stability and life of apparatus. Further, the power-taking device of the present disclosure is turned on by making the first, second and third conductive parts 10, 20 and 30 in contact with each other, without using a special towline or cable, which reduces manufacturing cost, simplifies structure and reduces labor for assembly and maintenance while ensuring the same function.

In an embodiment, as shown in FIGS. 2, 3, 4, and 6, the first conductive part 10 includes a power-taking cable 11 connected to the power supply and a first contact part 12 fixed to a second surface of the fixing plate 210. The second conductive part 20 includes a connecting cable 21, a first power-taking plate 22 and a second contact part 23, the first power-taking plate 22 and the second contact part 23 are respectively fixed to a first surface and a second surface of the power plate 220, and are electrically connected to each other via the connecting cable 21, and the first power-taking plate 22 faces the first contact part 12. The third conductive part 30 includes a second power-taking plate 31 fixed to a first surface of the extension plate 230 and facing the second contact part 23. When the first contact part 12 is in contact with the first power-taking plate 22 and the second contact part 23 is in contact with the second power-taking plate 31, the power-taking device is turned on, and the actuating mechanism 530 for the shifting fork obtains the power from the power supply, so that the shifting fork 240 can be driven to be rotated.

The first conductive part 10 may further include a first insulating block 13, and the first contact part 12 is insulated from and fixed to the fixing plate 210 via the first insulating block 13. In an embodiment, the first insulating block 13 and the fixing plate 210 are coupled via a screw 14, and the first contact part 12 and the first insulating block 13 are coupled via a screw 15.

The second conductive part 20 may further include a second insulating block 24, and the first power-taking plate 22 is insulated from and fixed to the power plate 220 via the second insulating block 24. In an embodiment, the first power-taking board 22 is coupled to the second insulating block 24 via a screw, and the second insulating block 24 is coupled to the power board 220 via a screw.

The third conductive part 30 may further include a third insulating block 32, and the second power-taking plate 31 is insulated from and fixed to the extension plate 230 via the third insulating block 32. In an embodiment, the second power-taking plate 31 is coupled to the third insulating block 32 via a screw, and the third insulating block 32 is fixedly coupled to the extension plate 230.

It should be understood that the coupling manners of the above structures are not limited thereto, and any manner in which the coupling can be achieved is within the protection scope of the present disclosure.

The loading mechanism 200 of the rail guide vehicle is provided with a plurality of power-taking points, and each of the power-taking points is provided with one of the power-taking devices. When the power plate 220 and the extension plate 230 move to the corresponding power-taking point, the power-taking device at the power-taking point is turned on to supply power to the shifting fork 240.

In the present disclosure, the position and the number of the power-taking points may be determined by the position where the shifting fork 240 picks up/sends the container 400.

In an embodiment, one cycle for picking up/sending the container 400 is as follows: the extension plate 230 reaches out to an outer edge of the container 400—the shifting fork 240 rotates to get the container 400—the extension plate 230 retracts—the rail guide vehicle starts—the extension plate 230 reaches out—the shifting fork 240 rotates—the extension plate 230 retracts. Therefore, the power-taking points, i.e., the first power-taking point P1 and the second power-taking point P2 shown in FIG. 4, may be respectively provided at both ends of the loading mechanism 200. When the loading mechanism 200 is in an unextended state, the power-taking device at the first power-taking point P1 is turned on, and then power is supplied to the shifting fork 240. When the power plate 220 and the extension plate 230 move until the shifting fork 240 reaches a ready-to-rotate position, and then the power-taking device at the second power-taking point P2 is turned on, the power is provided to the shifting fork 240 for rotating. After the shifting fork 240 stops rotating, the power plate 220 and the extension plate 230 move again, the power-taking device at the second power-taking point P2 is turned off, and the power supply is stopped.

The power-taking device further includes a power plate cable 41 and an extension plate cable 42, the first power-taking plates 22 of two adjacent power-taking devices are electrically connected via the power plate cable 41, and the second power-taking plates 31 of the two adjacent power-taking devices are electrically connected via the extension plate cable. Therefore, when the power-taking device at one of the power-taking points is turned on, the other power-taking points may be electrically connected to the power-taking device at said one of the power-taking points through the power plate cable 41 and the extension plate cable 42, so that the respective power-taking devices are supplied with power without providing each of the power-taking devices with a corresponding external power supply, which simplifies structure and facilitates operation.

Figure 6:
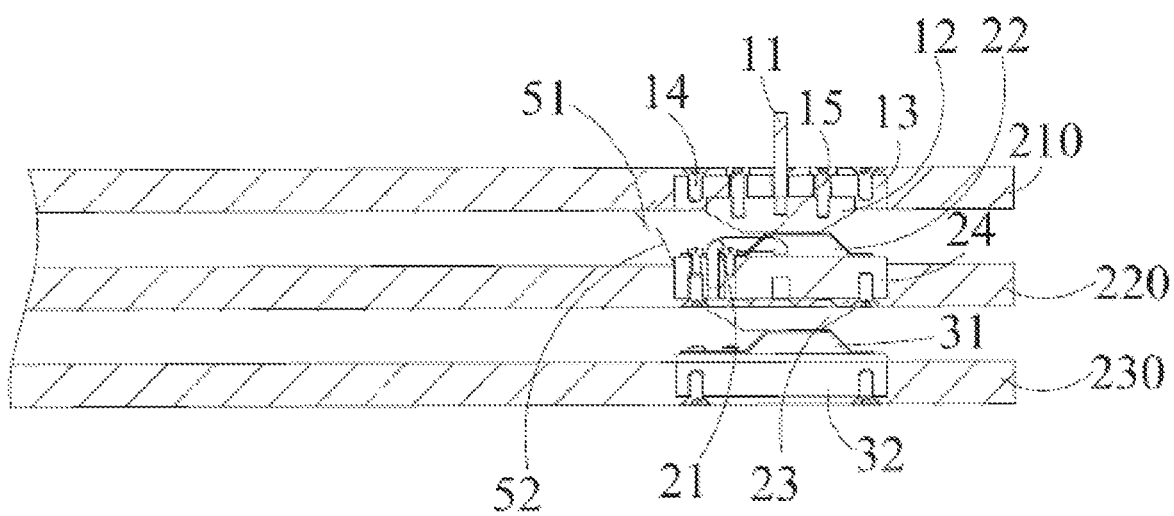
FIG. 6 is a partially enlarged view of part C in FIG. 4.

As shown in FIG. 6, in an embodiment, the power-taking device further includes a tripping stopper 51 and a switch 52, the tripping stopper 51 is provided on the second surface of the fixing plate 210, and the switch 52 is provided on the first surface of the power plate 220 close to the tripping stopper 51. After the first conductive part 10, the second conductive part 20 and the third conductive part 30 are in contact with each other, the tripping stopper 51 stirs the control switch 52 so that the power-taking device is turned on.

Specifically, when the loading mechanism 200 is in the unextended state, the power-taking device at the first power-taking point is turned on to supply power to the shifting fork 240. Subsequently, when the power plate 220 and the extension plate 230 move until the shifting fork 240 reaches the ready-to-rotate position, the first conductive part 10, the second conductive part 20, and the third conductive part 30 at the second power-taking point come into contact with each other. At this time, the tripping stopper 51 and the switch 52 of the power-taking device at this power-taking point are disconnected, and thus this power-taking device is turned off. Then, the tripping stopper 51 trips the switch 52 so that the power-taking device is turned on.

In this embodiment, one mechanism of the tripping stopper 51 is designed to be provided between the power plate 220 and the fixing plate 210, and the system can only take power when the tripping stopper trips the switch 52, so that an arching phenomenon cam be prevent from occurring due to poor contact at the moment when the contact part and the power plate come into contact. Therefore, this can extend the time for maintenance and replacement of the power-taking device, thereby improving production efficiency and reducing costs.

In this embodiment, the first contact part 12 or the first power-taking plate 22 has elasticity, and the second contact part 23 or the second power-taking plate 31 has elasticity. That is to say, one of the contact part and the power-taking plate that are in contact with each other has elasticity. Therefore, when the two are in contact with each other, they press against each other to be in a closer contact with each other, which ensures stable conduction. In addition, the respective contact parts and power-taking plate are made of materials with good conductivity and wear resistance.

In an embodiment, as shown in FIG. 5, the first power-taking plate 22 and the second contact part 23 are staggered longitudinally. That is, the part of the power-taking device between the power plate 220 and the fixing plate 210 is not on the same vertical plane as the part thereof between the power plate 220 and the extension plate 230, thereby facilitating structure arrangement and making the structure not too complicated or with no any interference.

The power-taking device of the present disclosure is provided on the fixing plate, the power plate and the extension plate of the loading mechanism instead of being provided on the shifting fork, and no cable is provided on the shifting fork, therefore, the movement of the shifting fork would not be affected and thus problems such as wear can be avoided, thereby improving stability and life of apparatus. Further, the power-taking device of the present disclosure is turned on by making the first, second and third conductive parts in contact with each other, without using a special towline or cable, which reduces manufacturing cost, simplifies structure and reduces labor for assembly and maintenance while ensuring the same function.

Although the present disclosure has been described with reference to several exemplary embodiments, it should be understood that the terms used are illustrative and exemplary rather than restrictive. Since the present disclosure can be implemented in various forms without departing from the spirit or essence of the invention, it should be understood that the above embodiments are not limited to any of the foregoing details, but should be widely interpreted within the spirit and scope defined by the appended claims. Therefore, all changes and modifications falling within the scope of the claims or their equivalents should be covered by the appended claims.

What is claimed is:

1. A power-taking device for a rail guide vehicle, wherein the rail guide vehicle comprises a chassis travelling mechanism and a loading mechanism on the chassis travelling mechanism, the loading mechanism comprises a fixing plate, a power plate, an extension plate and a shifting fork, the fixing plate is fixed to the chassis travelling mechanism, the power plate and the extension plate are configured to be translated with respect to the fixing plate, and the shifting fork is coupled to the extension plate, and is configured to be translated in synchronization with the extension plate, and to be rotated with respect to the extension plate, wherein the power-taking device for the rail guide vehicle comprises:
a first conductive part, fixed to the fixing plate and electrically connected to a power supply;
a second conductive part, fixed to the power plate; and
a third conductive part, fixed to the extension plate and electrically connected to an actuating mechanism for the shifting fork, wherein when the first conductive part, the second conductive part and the third conductive part are in contact with each other, the power-taking device is turned on, and the actuating mechanism for the shifting fork obtains power from the power supply, so that the shifting fork is driven to be rotated.

2. The power-taking device for the rail guide vehicle according to claim 1, wherein
each of the fixing plate, the power plate and the extension plate comprises a first surface and a second surface opposite to each other;
the first conductive part comprises a power-taking cable connected to the power supply and a first contact part fixed to the second surface of the fixing plate;
the second conductive part comprises a connecting cable, a first power-taking plate and a second contact part, the first power-taking plate and the second contact part are respectively fixed to the first surface and the second surface of the power plate, and are electrically connected to each other via the connecting cable, and the first power-taking plate faces the first contact part;
the third conductive part comprises a second power-taking plate fixed to the first surface of the extension plate and facing the second contact part; and
when the first contact part is in contact with the first power-taking plate and the second contact part is in contact with the second power-taking plate, the power-taking device is turned on, and the actuating mechanism for the shifting fork obtains the power from the power supply, so that the shifting fork is driven to be rotated.

3. The power-taking device for the rail guide vehicle according to claim 2, wherein the power-taking device further comprises a tripping stopper and a switch, the tripping stopper is provided on the second surface of the fixing plate, and the switch is provided on the first surface of the power plate and close to the tripping stopper;
after the first conductive part, the second conductive part and the third conductive part are in contact with each other, the tripping stopper stirs the switch so that the power-taking device is turned on.

4. The power-taking device for the rail guide vehicle according to claim 2, wherein one of the first contact part and the first power-taking plate has elasticity, and one of the second contact part and the second power-taking plate has elasticity.

5. The power-taking device for the rail guide vehicle according to claim 2, wherein the first power-taking plate and the second contact part are staggered longitudinally.

6. The power-taking device for the rail guide vehicle according to claim 2, wherein the loading mechanism of the rail guide vehicle is provided with a plurality of power-taking points, and each of the power-taking points is provided with one of the power-taking devices.

7. The power-taking device for the rail guide vehicle according to claim 6, wherein the power-taking points comprise a first power-taking point and a second power-taking point which are located at both ends of the loading mechanism, respectively.

8. The power-taking device for the rail guide vehicle according to claim 6, wherein the power-taking device further comprises a power plate cable and an extension plate cable, the first power-taking plates of two adjacent power-taking devices are electrically connected via the power plate cable, and the second power-taking plates of the two adjacent power-taking devices are electrically connected via the extension plate cable.

9. The power-taking device for the rail guide vehicle according to claim 1, wherein the first conductive part further comprises a first insulating block, and the first contact part is insulated from and fixed to the fixing plate via the first insulating block;
the second conductive part further comprises a second insulating block, and the first power-taking plate is insulated from and fixed to the power plate via the second insulating block; and
the third conductive part further comprises a third insulating block, and the second power-taking plate is insulated from and fixed to the extension plate via the third insulating block.

10. The power-taking device for the rail guide vehicle according to claim 1, wherein the rail guide vehicle further comprises a first guide rail and a second guide rail, the fixing plate and the power plate are coupled via the first guide rail, and the power plate and the extension plate are coupled via the second guide rail.

11. A rail guide vehicle, comprising a chassis travelling mechanism and a loading mechanism on the chassis travelling mechanism, wherein the loading mechanism comprises a fixing plate, a power plate, an extension plate and a shifting fork, the fixing plate is fixed to the chassis travelling mechanism, the power plate and the extension plate are configured to be translated with respect to the fixing plate, and the shifting fork is coupled to the extension plate, and is configured to be translated in synchronization with the extension plate, and to be rotated with respect to the extension plate,
wherein the rail guide vehicle further comprises a power-taking device, and the power-taking device comprises:
a first conductive part, fixed to the fixing plate and electrically connected to a power supply;
a second conductive part, fixed to the power plate; and
a third conductive part, fixed to the extension plate and electrically connected to an actuating mechanism for the shifting fork,
wherein when the first conductive part, the second conductive part and the third conductive part are in contact with each other, the power-taking device is turned on, and the actuating mechanism for the shifting fork obtains power from the power supply, so that the shifting fork is driven to be rotated.

12. The rail guide vehicle according to claim 11, wherein each of the fixing plate, the power plate and the extension plate comprises a first surface and a second surface opposite to each other;
the first conductive part comprises a power-taking cable connected to the power supply and a first contact part fixed to the second surface of the fixing plate;
the second conductive part comprises a connecting cable, a first power-taking plate and a second contact part, the first power-taking plate and the second contact part are respectively fixed to the first surface and the second surface of the power plate, and are electrically connected to each other via the connecting cable, and the first power-taking plate faces the first contact part;
the third conductive part comprises a second power-taking plate fixed to the first surface of the extension plate and facing the second contact part; and
when the first contact part is in contact with the first power-taking plate and the second contact part is in contact with the second power-taking plate, the power-taking device is turned on, and the actuating mechanism for the shifting fork obtains the power from the power supply, so that the shifting fork is driven to be rotated.

13. The rail guide vehicle according to claim 12, wherein the power-taking device further comprises a tripping stopper and a switch, the tripping stopper is provided on the second surface of the fixing plate, and the switch is provided on the first surface of the power plate and close to the tripping stopper;

after the first conductive part, the second conductive part and the third conductive part are in contact with each other, the tripping stopper stirs the switch so that the power-taking device is turned on.

14. The rail guide vehicle according to claim 12, wherein one of the first contact part and the first power-taking plate has elasticity, and one of the second contact part and the second power-taking plate has elasticity.

15. The rail guide vehicle according to claim 12, wherein the first power-taking plate and the second contact part are staggered longitudinally.

16. The rail guide vehicle according to claim 12, wherein the loading mechanism of the rail guide vehicle is provided with a plurality of power-taking points, and each of the power-taking points is provided with one of the power-taking devices.

17. The the rail guide vehicle according to claim 16, wherein the power-taking points comprise a first power-taking point and a second power-taking point which are located at both ends of the loading mechanism, respectively.

18. The rail guide vehicle according to claim 16, wherein the power-taking device further comprises a power plate cable and an extension plate cable, the first power-taking plates of two adjacent power-taking devices are electrically connected via the power plate cable, and the second power-taking plates of the two adjacent power-taking devices are electrically connected via the extension plate cable.

19. The rail guide vehicle according to claim 11, wherein the first conductive part further comprises a first insulating block, and the first contact part is insulated from and fixed to the fixing plate via the first insulating block;

the second conductive part further comprises a second insulating block, and the first power-taking plate is insulated from and fixed to the power plate via the second insulating block; and the third conductive part further comprises a third insulating block, and the second power-taking plate is insulated from and fixed to the extension plate via the third insulating block.

20. The rail guide vehicle according to claim 11, wherein the rail guide vehicle further comprises a first guide rail and a second guide rail, the fixing plate and the power plate are coupled via the first guide rail, and the power plate and the extension plate are coupled via the second guide rail.

* * * * *